Nov. 25, 1969  R. NICYPER  3,479,741
SET OF UNDERLAY DRAFTING PANELS
Filed April 18, 1967  7 Sheets-Sheet 1

Raymond Nicyper INVENTOR.
BY Michael S. Striker
Attorney

Nov. 25, 1969  R. NICYPER  3,479,741
SET OF UNDERLAY DRAFTING PANELS
Filed April 18, 1967  7 Sheets-Sheet 2

Raymond Nicyper
INVENTOR.
BY

Nov. 25, 1969 R. NICYPER 3,479,741
SET OF UNDERLAY DRAFTING PANELS
Filed April 18, 1967 7 Sheets-Sheet 3

Raymond Nicyper
INVENTOR.

BY

Nov. 25, 1969  R. NICYPER  3,479,741
SET OF UNDERLAY DRAFTING PANELS

Filed April 18, 1967  7 Sheets-Sheet 4

Raymond Nicyper INVENTOR.

BY

Nov. 25, 1969   R. NICYPER   3,479,741
SET OF UNDERLAY DRAFTING PANELS
Filed April 18, 1967   7 Sheets-Sheet 6

Raymond Nicyper
INVENTOR.

BY

Nov. 25, 1969  R. NICYPER  3,479,741
SET OF UNDERLAY DRAFTING PANELS
Filed April 18, 1967  7 Sheets-Sheet 7

Raymond Nicyper
INVENTOR.

BY

United States Patent Office 3,479,741
Patented Nov. 25, 1969

3,479,741
SET OF UNDERLAY DRAFTING PANELS
Raymond Nicyper, Birch Hill, Weston, Conn. 06880
Filed Apr. 18, 1967, Ser. No. 631,659
Int. Cl. G01b 5/24; B431 5/00
U.S. Cl. 33—1
10 Claims

ABSTRACT OF THE DISCLOSURE

A set of underlay drafting panels includes a plurality of panels each having at least one pair of spaced opposite parallel elongated edge portions. At least some of the panels are of different widths between these edge portions. At least one group of indicia lines are provided on each of the panels extending between points located equidistantly from one another along one of the edge portions within a predetermined elongated first zone and spaced at a first distance, to corresponding points located equidistantly from one another along the other edge portion within a second zone which is longer than the predetermined zone of the first edge portion and is spaced at a second distance greater than the first distance. The first and second zones of the edge portions of all panels are located on some of the panels in identical relationship and on the remaining ones of the panels in a second relationship constituting a mirror-image reversal with the indicia lines on all panels being so arranged that each plane of the respective panels has a constant viewing angle and the viewing points remain the same distance from the center of vision even when transposed with reference to one another.

---

The present invention relates to a drafting device, and more specifically to a set of underlay drafting panels.

Every draftsman is faced with the problems of producing one-, two-, and three-point perspective views. Usually, illustrations of this type require relatively laborious constructions of the perspective view, or painstaking transferrance of orthographic elevational views by the point-by-point method. This can, to some extent, be aided by graticulation, that is overlapping or underlying of the orthographic view with a square grid to locate points which are then transferred to their corresponding positions on the perspective drawing. However, it has long been desired to ease the construction of perspective views further so as to facilitate the work of the draftsman.

Realizing this, the invention is directed towards providing a simple and reliable manner of constructing perspective views. It is therefore a general object of providing a means for achieving this.

A more specific object of the invention is to provide a single means of this type which will permit the construction of one-, two-, and three-point perspective views, thereby decreasing the expenses involved in purchasing of drafting aids.

A further object of the invention is to provide such a means which will permit the construction of normal, wide-angle and distant views.

In accordance with one feature of the invention I provide a set of underlay drafting panels which comprises a plurality of panels of which each has at least one pair of spaced opposite parallel elongated edge portions. At least some of these panels are of different widths between these edge portions. Furthermore, at least one group of indicia lines is provided on each of these panels and extends between points located equidistantly from one another along one of the edge portions within a predetermined elongated first zone and spaced the first distance, to corresponding points located equidistantly from one another along the other of said opposite edge portions within a second zone which is longer than the predetermined zone of the first edge portion and these points being spaced at a second distance which is greater than the first distance. The first and second zones of the edge portions of all panels in the set of panels are located on some of these panels in identical relationship to each other along the opposite edge portions, and on the remaining ones of the panels in a second relationship which constitutes a mirror-image reversal of the first relationship.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
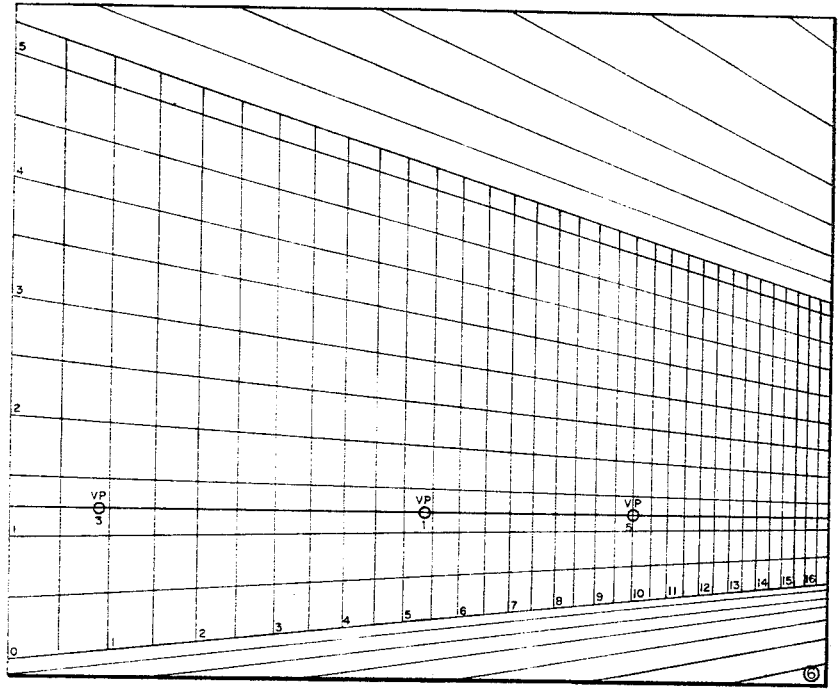
FIGS. 1–6 show various corrective perspective panels of the set, each having an accurate perspective scaling grid and additional perspective guide lines.
Figure 2:
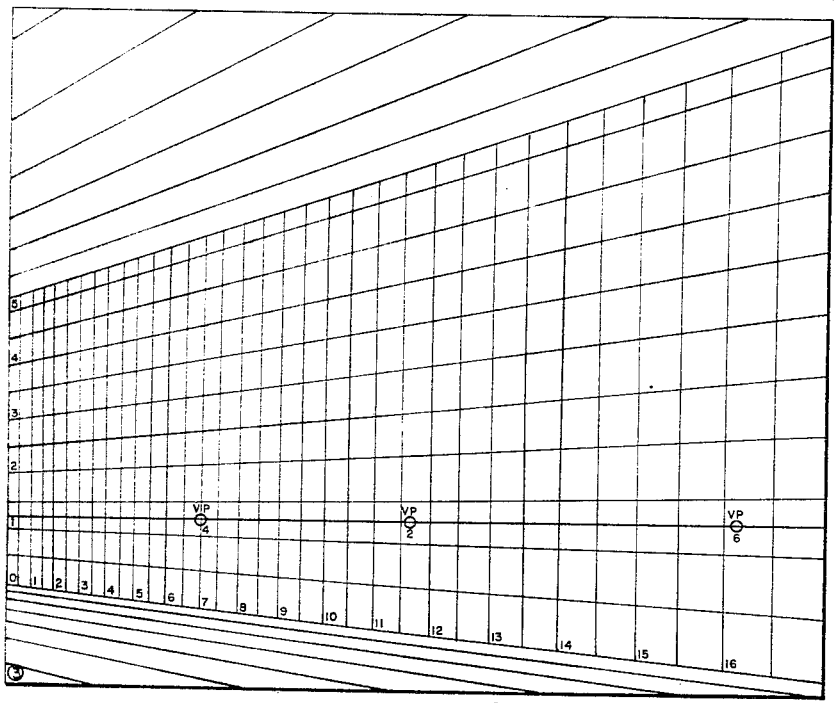
Figure 3:
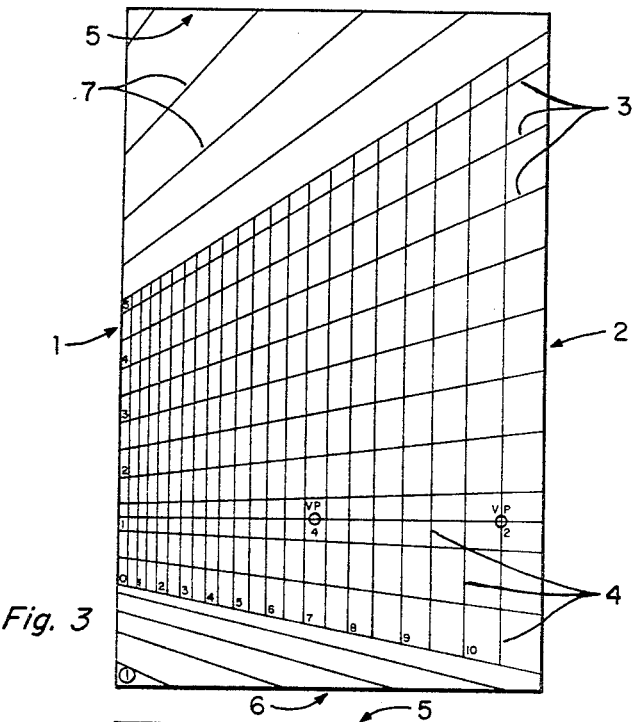
Figure 4:
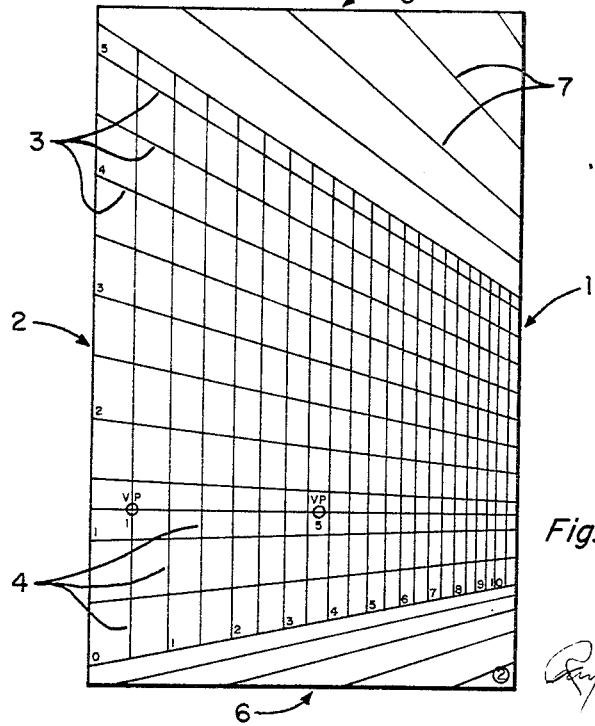
Figure 5:
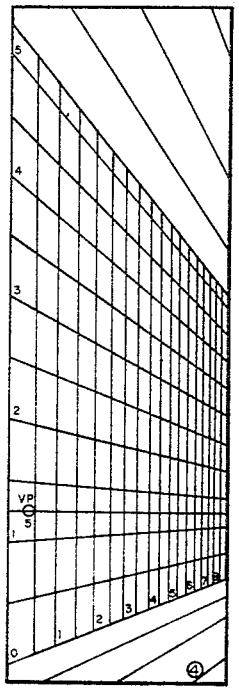
Figure 6:
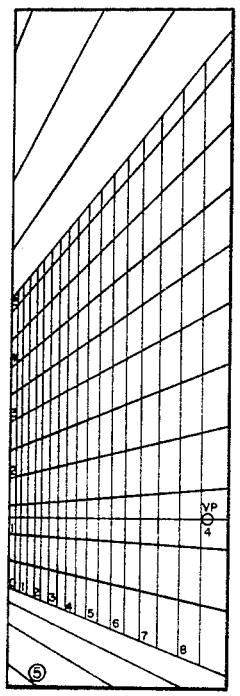

Discussing now the drawing in detail, and firstly FIG. 1 thereof, it will be seen that the panels shown in FIGS. 1–6 are each provided with two pair of spaced opposite parallel elongated edge portions 1, 2, but that the panels are of varying different widths between these edge portions 1, 2. Each of the panels is provided with a first group 3 of indicia lines extending between points along one of the edge portions, here edge portion 1, in an elongated zone, such points being located equidistantly from one another spaced along the zone, and these lines of the first group 3 extending to corresponding points which extend along another narrow zone extending along the other edge portion, here portion 2, which are also equidistantly spaced from one another, but by a dis'ance which is greater than the first distance. Thus, the indicia lines of the first group 3 taper in the direction from the one edge portion 1 toward the other edge portion 2.

There are further provided additional indicia lines, hereafter referred-to as the second set 4 of indicia lines, which extend parallel to these edge portions 1, 2 and normal to additional edge portions 5, 6 which latter extend transversely to the first mentioned edge portions 1, 2 and connect the same. These second indicia lines 4 extend also parallel to one another and it will be seen that their spacing decreases in the direction from the edge portion 2 toward the edge portion 1. The indicia lines of the second group 4 extend transversely of the indicia lines of the first group 3 between the uppermost and lowermost line of the first group 3. The remainder of each panel is filled with additional perspective guide lines 7 which are not, however, intersected by indicia lines of the second group 4. Thus, the intersecting lines of the first and second group provide a scaling grid which permits accurate scaling of a perspective view to be constructed.

Figure 7:
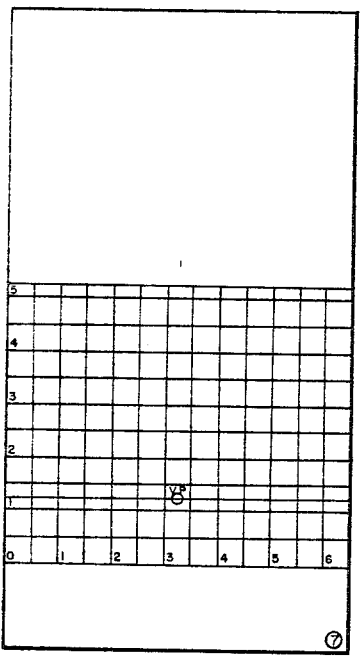
FIGS. 7 and 8 show panels having square grids used in combination with the panels of FIGS. 1–6 for constructing one-point perspective views and also for underlaying orthographic views to aid transferrence to the novel perspective panels by graticulation.
Figure 8:
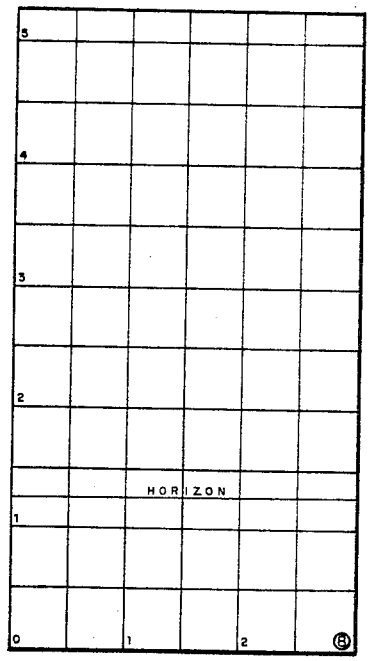
Figure 9:
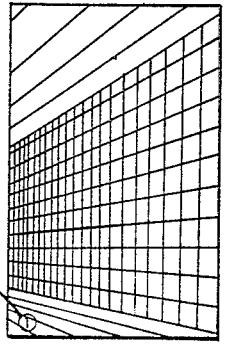
FIGS. 9–14 show the basic procedure for using the set of panels in accordance with the present invention.
Figure 10:
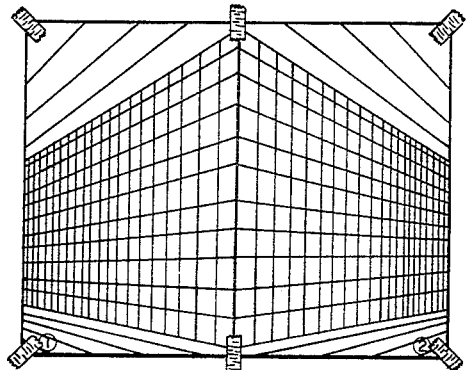
Figure 11:
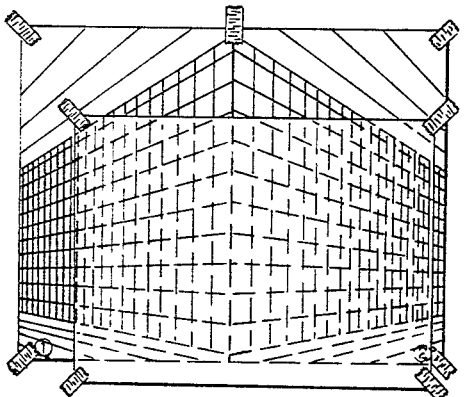

It will be noted that the set in accordance with the present invention contains two identical panels which are, however, mirror-symmetrically reversed. The set further contains the square grids shown in FIGS. 7 and 8 which are used for one-point perspective and also for underlaying orthographic views to aid transferrance to a perspective panel by the method known generally as graticulation. These square grids shown in FIGS. 7 and 8, are, however, to be used with the panels of FIGS. 1–6 and require no particular explanation since they are thoroughly conventional. All of the panels of which, as will be clear, there are eight in the particular set illustrated here, are consecutively numbered for ease of identification, preferably in a corner.

FIGS. 9–14 show the basic procedure for using the panels in accordance with the present invention. Firstly, the draftsman will determine which view is the most suitable for the planned drawing. He will then select the proper panel or panels according to the identifying numbers mentioned before. Let it be assumed that the first panel selected is numbered 1 and that the second panel is numbered 2, that is two mirror-symmetrically reversed panels. These are taped to the drafting board after it has been ascertained that the horizon lines are precisely aligned and that the panels are tightly butted together for accuracy.

Figure 12:
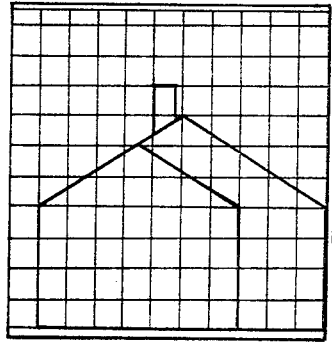
Figure 12:
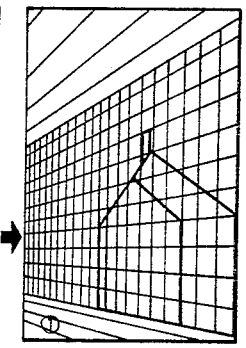
Figure 13:
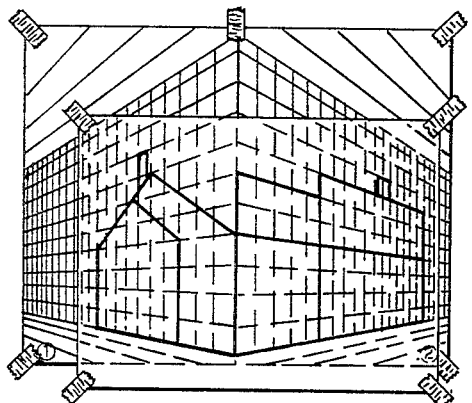

Thereupon, as shown in FIG. 12, tracing paper is placed oved the combined panels. As shown in FIG. 13 an orthographic elevational view is now transferred to a perspective panel, point by point, and in order to avoid possible error the graticulation method may be used, that is the orthographic view may be overlapped or underlaid with a square-grid panel of the set to permit quick and accurate location of points which are then transferred to their corresponding position on the perspective-grid panel 1.

Figure 14:
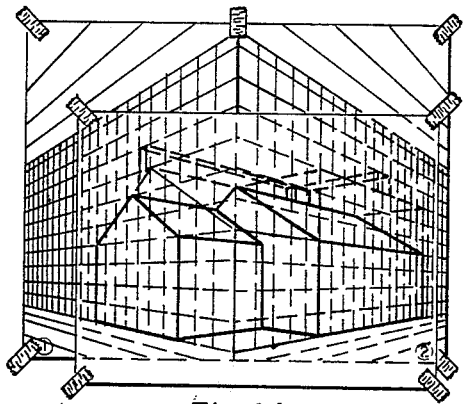

FIG. 14 shows transfer of the second orthographic elevation view to the adjacent panel, that is panel number 2, and it will be understood that the remainder of the drawing will be constructed in a similar manner. Obviously, the panels in accordance with the present invention facilitate greatly the construction of a perspective view as is clearly evident from the explanation in FIGS. 9–14.

By way of example, the following figures illustrate various possible views which can be readily and easily constructed with the panels in accordance with the present invention.

Figure 15:
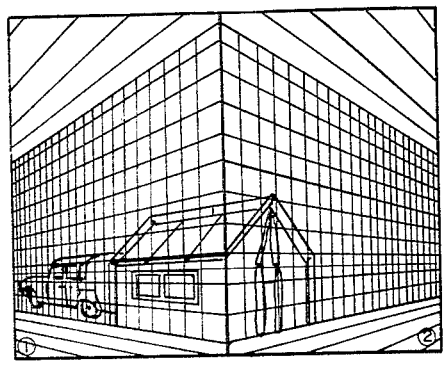
FIG. 15 shows a normal exterior view constructed with panels in accordance with the present invention.

FIG. 15 shows a normal exterior view constructed from panels 5 and 6 of the set in accordance with the present invention. It should be noted that this type of view is based on the average angle of vision from the human eye, with the picture plane placed at a normal viewing distance.

Figure 16:
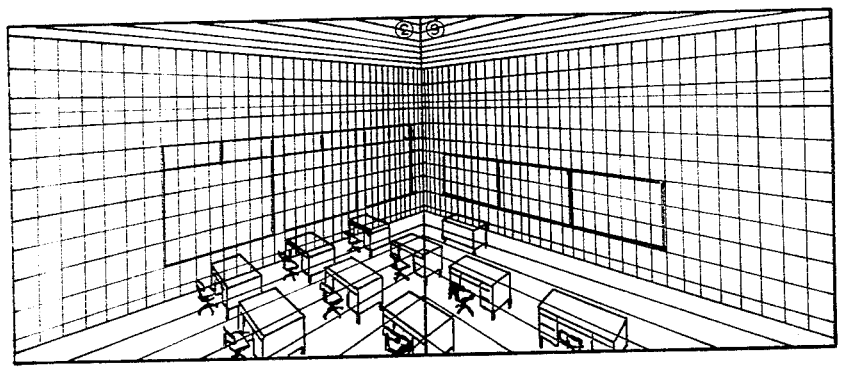
FIG. 16 shows a normal interior view.

FIG. 16 is again a normal view, this time of an interior, and it should be noted that again the view is based on the average angle of vision for the human eye.

Figure 17:
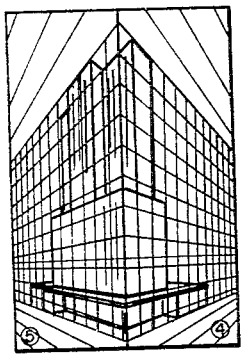
FIG. 17 shows an exterior wide-angle view obtained with panels of the set in accordance with the present invention.

The panels can also be used with equal ease and facility for wide-angle views, and FIG. 17 shows an exterior wide-angle view utilizing panels 5 and 4 of the set. Use of the panels in this manner provides the exaggeration which is required in wide-angle views, namely accenting of the height of an object and compressing of its width so that wide areas may be illustrated on a narrow drawing just as they would be reproduced by a wide-angle camera lens.

Figure 18:
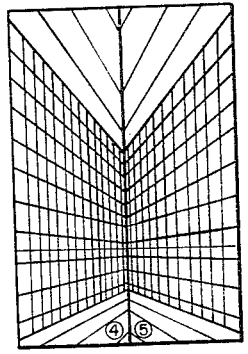
FIG. 18 shows an interior wide-angle view.

The illustration in FIG. 18 shows a wide-angle interior view, also utilizing panels 4 and 5, but it should be noted that whereas in the exterior view of FIG. 17, panel 5 was located on the left side of the illustration while panel 4 was located on the right side, the relationship in FIG. 18 is reversed with panel 4 being located on the left and panel 5 being located on the right side. Thus, the narrow edge portions of the grids are now located in abutment whereas before it was the wider or higher edge portions of the same grids which were located in abutment.

Figure 19:
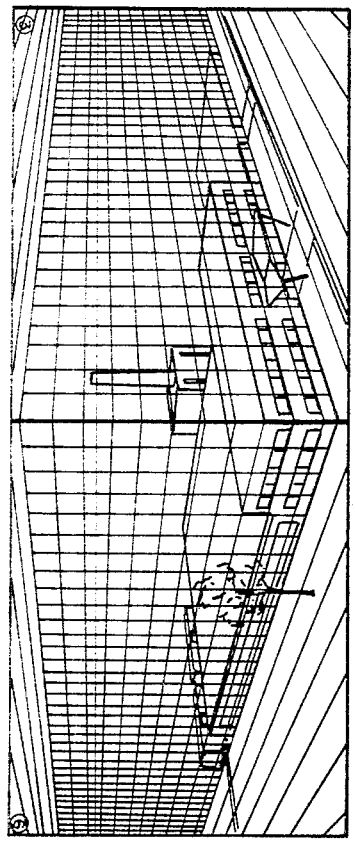
FIG. 19 shows a distant view drawn with panels in accordance with the present invention.

FIG. 19 illustrates a distant view, here of a building. This type of view is used if length is to be accentuated and it will be seen that this is very simply accomplished by utilizing the panels in accordance with the present invention, here panels 3 and 2 of the set.

Figure 20:
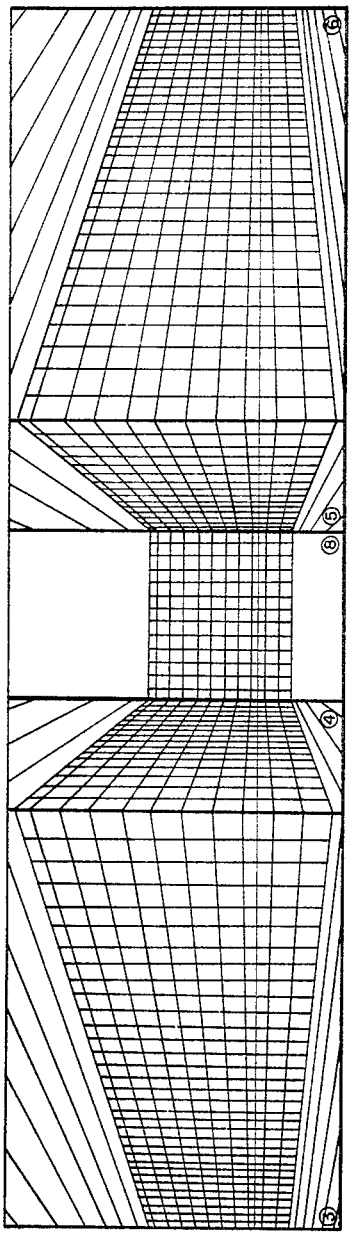
FIG. 20 shows the use of panels in accordance with the present invention to simulate the effect of a 180-degree wide-angle camera.

However, the panels in accordance with the present invention have considerably greater versatility than has been indicated herebefore. They can, for instance, be used also for special effects, such as for the simulated effect of a 180-degree wide-angle camera depicted in FIG. 20. This, of course, is a controlled-distortion effect, and other such effects are readily attainable with panels in accordance with the present invention.

Figure 21:
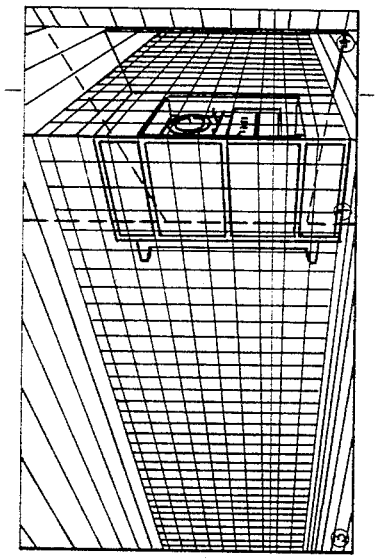
FIG. 21 shows the use of panels in accordance with the present invention to simulate an aerial view.

Another possibility is shown in FIG. 21 where it will be seen that turning the combined panels through 90-degrees permits the ready construction of aerial views or "sky-scraper" perspective view. The music cabinet shown in FIG. 21 is drawn by utilizing panels 3 and 4.

Figure 22:
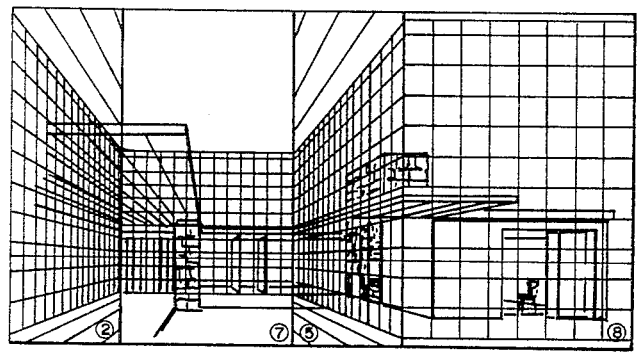
FIG. 22 shows the panels of FIGS. 7 and 8 utilized in constructing a one-point perpsective view.

FIG. 22, finally, shows the panels of FIGS. 7 and 8 applied in constructing a one-point perspective view.

The panels are highly versatile, as is already evident. They permit, as has been pointed out, the construction of one-point perspective, the construction of two-point perspective, and even the construction of limited forms of three-point perspective. The latter is obtained by using 45-degree diagonals drawn from corner to corner of the panels as the guide for perspective drawing construction. This is possible since each of the panels is a plane panel in one-point perspective, so that it can also be considered a basic grid in two-point perspective when the diagonals are drawn. Most of the interior and exterior basic views are adaptable to this method of constructing three-point perspective views. Additional range, latitude and number of applications can be obtained by using the grids as intersecting planes.

The latter application is particularly useful for architecture and interiors since in this way the viewing angle may be changed to meet critical situations and since the combination of interior and exterior views is made flexible to permit the draftsman to adapt himself to difficult or complex problems.

Parallel planes can also be constructed in accordance with the present invention, and are suitable particularly for multiple subjects, such as architectural details, railroad cars depicted on parallel tracks, mechanical schematics and the like. This is also true of rotated planes and certain constructions involving such rotated planes may be based on panels in accordance with the present invention. The planes can pivot from a common point, or may be accomplished by employing the principle of intersecting planes. Obviously, inclined planes can also be drawn utilizing the panels in accordance with the present invention and it is simply necessary to coincide the corresponding grid edges of matching panels, such as panels 1 and 2, 4 and 5, or 3 and 6. This greatly facilitates the drawing of such items as cathedral ceilings, lanscaped terraces, or sloping console panels.

It will be understood, of course, that the panels in accordance with the present invention can also be combined and expanded for the convenience of drafting reflected surfaces over greater perspective panoramic areas are required. This is possible, for instance, by overlapping top and bottom panel layouts, and care must then be taken to align the horizons of the overlapped panels.

Furthermore, it is not always necessary to utilize more than one panel. Situations are possible where a single one of the panels can be used, and this is particularly true if the problem primarily requires picturing a two-dimensional plane in perspective, or where foreground-to-background measuring is not of major importance. In this case the view may be constructed by placing a vanishing point at any convenient desirable location on the horizon for the purpose of foreshortening the depth of the subject. Panels 3 and 6 of the set in accordance with the present invention are most useful for this particular purpose.

The versatility of the panels in accordance with the present invention will be understood. To recapitulate, the panels in planned combinations form interior and exterior views in one-, two-, and three-point perspective in normal, wide-angle and distant views. The panels can also be combined to make interior-exterior panoramas and to provide rotated planes, parallel planes, inclined planes, intersecting planes, aerial views, special effects similar to the curved panorama of 180-degree camera photographs, and others. The correlated panels incorporate raymonic "corrective perspective," which minimize the "stretch" distortion formed at the outer extremes of conventional perspective.

It will be understood that each of the elements described above, or two or more together, may also find a useful application in other types of a set of underlay drafting panels differing from the types described above.

While the invention has been illustrated and described as embodied in underlay drafting panels, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be secured by Letters Patent is:

1. A set of underlay drafting panels each having at least a first and a transversely spaced second edge portion paralleling said first edge portion, said set comprising a first plurality of panels each having a different width between said edge portions; at least one first group of perspective indicia lines on each panel of said first plurality of panels and extending on each of said panels between points located along said first edge portions of all of said panels at predetermined first distances, to corresponding points located along said second edge portions of all of said panels at predetermined second distances different from said first distances; a second plurality of panels each having a width between said edge portions identical with the width of a panel of said first plurality of panels; and at least one second group of perspective indicia lines on each panel of said second plurality of panels and extending on each of said panels of said second plurality of panels between points located along said first edge portions of all of said panels of said second plurality of panels at said predetermined second distances, to corresponding points located along said second edge portions of all of said panels of said second plurality of panels at said predetermined first distances, whereby each panel of different width of said first plurality of panels can be combined with each panel of said second plurality of panels by placing either of said first or second edge portions of the thus combined panels into cooperative relationship with one another, said set of panels being thus adapted for forming a plurality of different perspective combinations whose number is a multiple of the combined number of panels in said first and second pluralities of panels.

2. A set of underlay drafting panels as defined in claim 1, wherein each of said panels of said first and second plurality further comprises a pair of spaced opposite elongated parallel third edge portions extending between and connecting the respective first and second edge portions; and wherein said perspective indicia lines converge in the direction from one to the other of said first and second edge portions and are inclined with reference to said third edge portions.

3. A set of underlay drafting panels as defined in claim 1, wherein said perspective indicia lines converge in the direction from one to the other of said edge portions.

4. A set of underlay drafting panels as defined in claim 3, wherein all of said perspective indicia lines of a respective group converge in an imaginary common vanishing point located in space remote from said other edge portion in the general plane of the respective panel.

5. A set of underlay drafting panels as defined in claim 2, said perspective indicia lines of the respective first or second group covering at most a major portion of each of said panels; and further comprising supplementary lines covering the remainder of the respective panel and extending relative to the outermost lines of the respective group of perspective indicia lines and relative to each other in a relationship identical with the relationship of the lines of the respective group of perspective indicia lines relative to one another.

6. A set of underlay drafting panels as defined in claim 2; and further comprising an additional group of perspective indicia lines on each of said panels and extending intermediate said third edge portions of each panel parallel to one another and transversely of the perspective indicia lines of the respective first or second group.

7. A set of underlay drafting panels as defined in claim 6, wherein the spacing between the perspective indicia lines of said additional group decreases in the direction from one to the other of said first and second edge portions.

8. A set of underlay drafting panels as defined in claim 7, wherein the perspective indicia lines of said additional group extend between and connect the outermost perspective indicia lines of the respective first or second group, but terminate short of the respective third edge portions.

9. A set of underlay drafting panels as defined in claim 7, wherein the perspective indicia lines of said additional group extend substantially parallel to said first and second edge portions of the respective panel.

10. A set of underlay drafting panels as defined in claim 9, wherein the perspective indicia lines of said additional group define with the perspective indicia lines of the respective first or second group an angle of other than 90°.

References Cited

UNITED STATES PATENTS

| 229,404 | 6/1880 | Hamilton | 33—77 |
|---|---|---|---|
| 2,487,690 | 11/1949 | Black et al. | |
| 2,709,304 | 5/1955 | Negre | 33—77 |

FOREIGN PATENTS

| 971,148 | 6/1950 | France. |
| 450,388 | 7/1936 | Great Britain. |
| 813,932 | 9/1951 | Germany. |

WILLIAM D. MARTIN, JR., Primary Examiner

U.S. Cl. X.R.

33—77; 35—36